UNITED STATES PATENT OFFICE.

FRIEDRICH OHLMER, OF GRIESHEIM, NEAR FRANKFORT-ON-THE-MAIN, GERMANY.

CONTINUOUS PROCESS FOR RECOVERING LEAD OR ZINC OR BOTH METALS FROM THEIR ORES OR FROM SLAG IN THE FORM OF METAL FUMES, WHEREBY THE CHARGE IS MIXED WITH FUEL.

1,269,110.           Specification of Letters Patent.     Patented June 11, 1918.

No Drawing.      Application filed September 26, 1914. Serial No. 863,689.

*To all whom it may concern:*

Be it known that I, FRIEDRICH OHLMER, citizen of the German Empire, residing at Griesheim, near Frankfort-on-the-Main, Kingdom of Prussia, Germany, have invented certain new and useful improvements in continuous processes for recovering lead or zinc or both metals from their ores or from slag in the form of metal fumes, whereby the charge is mixed with fuel, of which the following is a specification.

The invention relates to a continuous process for recovering lead and zinc in form of fumes from lead and zinc ores, zincy lead, leady zinc, zincy slag and the like, which materials are charged in a revolving furnace after having been finely divided and then mixed with carbonaceous fuel.

A prior process of this kind (cf. U. S. patent of Dedolph No. 959,924) consists in using for the treatment of leady and zinciferous materials a revolving furnace, such as is employed in metallurgical practice for roasting and smelting purposes, the mixture of ore, or slag and carbonaceous fuel, being without special preparation charged to the furnace on one side and caused to travel along its bottom, while from the other side of the furnace the heating gases are admitted with an excess of air to the furnace chamber. In this way the charge becomes gradually heated, the ore is reduced, the disengaged metal oxidizes and is removed in form of fume, whereas liquid slag is continuously discharged at the other side of the furnace.

In some cases it has been found that the removal of volatile metals from the mixture of ore and fuel proceeds all the better the less there is of excess of air in the heating gases introduced to the reaction chamber. This is to be ascribed to the fact that with an excess of air in the heating gases the fuel admixed with the charge would be too much consumed, especially toward the admission point of the heating gases, so that finally there would not be left sufficient reducing material for driving out the volatile metals. If owing to the high temperature of the flames the charge is even brought to smelting, a great deal of for instance the zinc will be retained in the slag formed; for the already reduced zinc vapors will immediately reoxidize as soon as they are brought in contact with the strongly oxidizing gases, and the zinc oxid will be dissolved in the molten mass before it could escape the charge.

Therefore it will be advantageous to impart to the heating flame, as mentioned already, a reducing power, and to control the furnace temperature in such a way as to allow sintering to take place but no smelting of the charge. Practice has shown that the contents of carbon dioxid in the heating gases will suffice to oxidize the zinc vapors. Eventually such oxidation of the zinc and the like can be completed afterward by admitting air to the escaping vapors and gases. In this way such oxidation takes place more slowly that is to say later on, but not in the first stage of zinc vapor development. As the metallic zinc is not dissolved in the slagged constituents of the charge, the zinc contents of the charge is driven out much more thoroughly, the more so, as no smelting takes place. Of course what is said of zinc, applies as well to other volatile metals. As in many cases for realizing a strong reduction, it is of advantage to have a very high temperature, smelting may be prevented also by adequate mixture of the charge or by the addition of appropriate fluxing means, eventually allowing but sintering to take place.

This purpose is best attained by treating the material in the revolving furnace either in lump or granular form. By operating in this way the charge owing to its grainy or lump form will be very permeable to the furnace gases so as to cause on the one hand the material to be quickly heated and consequently accelerated reduction to take place. At the same time overheating of the charge in some places is avoided and hence destructive sticking or baking of the charge to the furnace wall prevented. Furthermore a purer oxid will be realized by treating a granulated charge or in form of pieces, as the furnace gases will carry along less dust.

The granulation or forming into lumps of the charge can be effected in different manners, whereby the reduction material can be previously admixed to the charge wholly or partially. Granulating may be attained for instance by the addition of agglutinants and by stirring the mass with subsequent heating to more or less extent, but this latter step can also be omitted. The charge may be formed into lumps for instance by briqueting and in this case the reduction material may previously be added to the charge.

For carrying out the process in an efficient manner, one may proceed as follows: After the charge has been eventually admixed with the necessary reduction coal, it is moistened to such an extent as to form a plastic or muddy mass. In this form the charge is introduced to a revolving furnace of preferably small dimensions and heated therein to temperatures below the reduction point of zinc oxid while the furnace is rotating. Thereby not only the charge is granulated but also its volatile destructive constituents are driven out and removed separately.

The material thus preheated, purified and freed from dust is preferably charged in hot state to a second revolving furnace, eventually with an admixture of reduction material.

Having thus described my invention and in what manner the same is to be performed, what I claim as new is:

1. The continuous process of recovering lead or zinc of both metals in the form of oxids from their ores and slags, which comprises feeding a mixture of the metalliferous material with carbonaceous fuel into a revolving furnace, heating the mixture therein in immediate contact with a heating flame to a temperature sufficient to effect the desired reduction without smelting the charge, maintaining a reducing atmosphere in the reduction zone of the furnace so as to avoid immediate reoxidation of the disengaged metal fumes in said zone, and oxidizing said fumes thereafter in an oxidizing zone; substantially as described.

2. The continuous process of recovering lead or zinc or both metals in the form of oxids from their ores and slags, which comprises feeding a mixture of the metalliferous material with carbonaceous fuel and other substances which will prevent smelting at relatively high temperatures into a revolving furnace, heating the mixture therein by direct contact with a heating flame to a temperature sufficient to effect the desired reduction without smelting the charge, maintaining a reducing atmosphere in the reduction zone of the furnace so as to avoid immediate reoxidation of the disengaged metal fumes in said reduction zone, and oxidizing said fumes thereafter in an oxidizing zone; substantially as described.

3. The continuous process of recovering lead or zinc or both metals in the form of oxids from their ores and slags, which comprises feeding a wet mixture of the metalliferous material with carbonaceous fuel into a revolving furnace, heating the mixture therein to below the reduction temperature of zinc oxid to granulate the charge, feeding the granulated material into a second revolving furnace and heating the same therein in immediate contact with a heating flame to a temperature sufficient to effect the desired reduction without smelting the charge, maintaining a reducing atmosphere in the reduction zone of said second furnace, so as to avoid immediate reoxidation of the disengaged metal fumes in said reduction zone, and oxidizing said fumes thereafter in an oxidizing zone; substantially as described.

In testimony whereof I have affixed my signature in presence of two witnesses.

FRIEDRICH OHLMER.

Witnesses:
ROBERT ENGLER,
JEAN GRUND.